United States Patent
Nishiura et al.

(10) Patent No.: US 6,913,851 B2
(45) Date of Patent: Jul. 5, 2005

(54) POLYETHER POLYMER COMPOUNDS AS WELL AS ION CONDUCTIBLE POLYMER COMPOSITIONS AND ELECTROCHEMICAL DEVICES USING THE SAME

(75) Inventors: Masahito Nishiura, Hyogo (JP); Michiyuki Kono, Osaka (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 308 days.

(21) Appl. No.: 10/096,159

(22) Filed: Mar. 12, 2002

(65) Prior Publication Data

US 2002/0182469 A1 Dec. 5, 2002

(30) Foreign Application Priority Data

Apr. 9, 2001 (JP) .......................................... 2001-110523

(51) Int. Cl.$^7$ ................................................ H01M 8/10
(52) U.S. Cl. ...................... 429/33; 429/317; 252/62.2; 521/25
(58) Field of Search ...................... 429/33, 317; 521/25; 252/62.2

(56) References Cited

U.S. PATENT DOCUMENTS

| 5,433,877 | A | * | 7/1995 | Kono et al. | ................. | 252/62.2 |
| 6,019,908 | A | * | 2/2000 | Kono et al. | ................. | 252/62.2 |
| 6,218,053 | B1 | * | 4/2001 | Kono et al. | ................. | 429/306 |
| 6,673,495 | B1 | * | 1/2004 | Nishiura et al. | ............ | 429/306 |

FOREIGN PATENT DOCUMENTS

| EP | 0 331 342 | 9/1989 |
| EP | 0 559 317 | 9/1993 |
| EP | 0 585 072 | 3/1994 |
| EP | 0 967 233 | 12/1999 |
| EP | 1 057 846 | 12/2000 |
| EP | 1057846 | * 12/2000 |
| EP | 1 130 671 | 9/2001 |
| EP | 1 160 268 | 12/2001 |

* cited by examiner

Primary Examiner—David W. Wu
Assistant Examiner—Henry S. Hu
(74) Attorney, Agent, or Firm—Jordan and Hamburg LLP

(57) ABSTRACT

The present invention is aimed to provide polyether polymers capable of improving an ion conductivity around room temperature as well as ion conductible polymer compositions and electrochemical devices using the same. The above objectives are achieved by using polyether polymers characterized by having the structure unit represented by the formula (1) and the structure unit represented by the formula (2) and/or the structure unit represented by the formula (3), and having polymerizable and/or non-polymerizable functional groups at each end of the molecular chains.

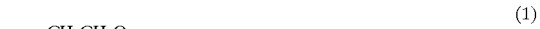

(1)

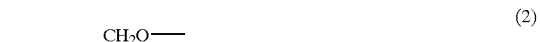

(2)

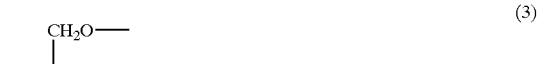

(3)

10 Claims, No Drawings

POLYETHER POLYMER COMPOUNDS AS WELL AS ION CONDUCTIBLE POLYMER COMPOSITIONS AND ELECTROCHEMICAL DEVICES USING THE SAME

BACKGROUND OF INVENTION

1. Field of the Invention

The present invention relates to novel polyether polymer compounds as well as ion conductible polymer compositions and electrochemical devices using the same.

2. Description of the Related Art

Straight polyether, for example, polyethylene oxide has been known to exhibit ion conductance by dissolving an electrolytic salt. However, it does not satisfy a performance requirement as a material for ion conductible polymer compositions due to its low ion conductance.

Thus, an effort to increase ion conductance has been attempted by using polymers having side chains obtained by separately synthesizing monomers capable of becoming side chains at polymerization and copolymerizing the monomers.

The polyether having such side chains exhibits higher ion conductance than straight polyether, but its ion conductivity around room temperature is still low and thus, improving this is to be the problem.

The invention has been carried out in the light of the above, and provides polyether polymers capable of improving an ion conductivity around room temperature, as well as ion conductible polymer compositions and electrochemical devices using the same.

SUMMARY OF THE INVENTION

The polyether polymer compounds of the invention are those having the structure unit represented by the formula (1) and the structure unit represented by the formula (2) and/or the structure unit represented by the formula (3), and having polymerizable functional groups and/or non-polymerizable functional groups at each end of the molecular chains.

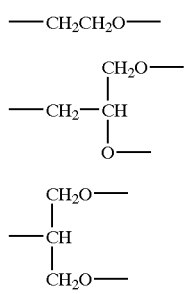

One or more selected from the group consisting of (meth)acrylate residues, aryl and vinyl groups can be used as the above polymerizable functional groups, and one or more selected from the group consisting of alkyl groups with carbon atoms from 1 to 6 and functional groups containing boron atoms can be used as the above non-polymerizable functional groups.

The ion conductible polymer compositions of the invention are those containing one or two or more of the above polyether polymer compounds. Or, they are those containing one or more of the above polyether polymer compounds and an electrolytic salt. And a non-aqueous solvent can be further contained in the ion conductible polymer composition.

The above ion conductible polymer compositions include those in which the polyether polymer compounds are crosslinked.

Further, the electrochemical devices of the invention is obtained by using any of the above ion conductible polymer compositions.

DESCRIPTION OF THE PREFERRED EMBODIMENT

1. Polyether Polymer Compounds

The polyether polymer compounds of the invention are obtained by reacting ethylene oxide and 2,3-epoxy-1-propanol with the starting material, or reacting 2,3-epoxy-1-propanol with ethylene glycol as the starting material to yield a polymer compound followed by introducing polymerizable and/or non-polymerizable functional groups at each end of a backbone and side chains in the resultant polymer compound.

The compounds having one or more active hydrogen residues and alkoxide can be used as the starting material.

Examples of active hydrogen residues for the compound having one or more active hydrogen residues include hydroxyl group, preferably having 1 to 5 active hydrogen residues. Specific examples of the compounds having one or more active hydrogen residues include triethyleneglycol monomethylether, ethyleneglycol, glycerine, diglycerine, pentaerythritol and their derivatives.

Also, specific examples of alkoxide include $CH_3ONa$, t-BuOK and their derivatives.

The polyether polymer compounds of the invention have the structure unit represented by the formula (1) as well as the structure unit represented by the formula (2) and/or the structure unit represented by formula (3). The number of the structure units represented by formula (1) in one molecule is from 1 to 22800, preferably from 5 to 11400, and more preferably from 10 to 5700. The number of the structure units of the formula (2) or (3) (but when both are included, it is the total number) is from 1 to 13600, preferably from 5 to 6800, and more preferably from 10 to 3400 as well as in one molecule.

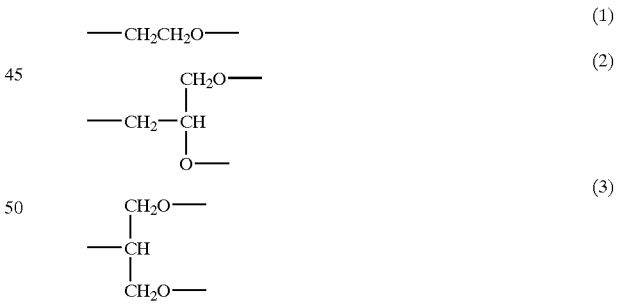

Examples of polymerizable functional groups introduced at each molecular end include (meth) acrylate residues, allyl groups and vinyl groups, and examples of non-polymerizable functional groups include alkyl groups or functional groups comprising boron atoms.

As the above alkyl groups, alkyl groups having 1 to 6 carbon atoms are preferable, ones having 1 to 4 carbon atoms are more preferable, and methyl groups are especially preferable.

Examples of functional groups comprising boron atoms include those represented by the following formula (4) or (5).

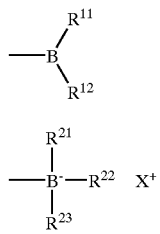

$$\begin{matrix} & R^{11} \\ & / \\ -B & \\ & \backslash \\ & R^{12} \end{matrix} \quad (4)$$

$$\begin{matrix} & R^{21} \\ & | \\ -B^- & -R^{22} \quad X^+ \\ & | \\ & R^{23} \end{matrix} \quad (5)$$

$R^{11}$, and $R^{12}$ in the formula (4) and $R^{21}$, $R^{22}$, and $R^{23}$ in the formula (5) may be identical or different, and each represents hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic, —B($R^a$) ($R^b$), —OB($R^a$)($R^b$) or OSi($R^a$)($R^b$)($R^c$). $R^a$, $R^b$ and $R^c$ each represents hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic or derivatives thereof. $R^{11}$, and $R^{12}$ in the formula (4) and $R^{21}$, $R^{22}$, and $R^{23}$ in the formula (5) may bind together to form a ring, and the ring may have substituents. Also, each group may be substituted with substitutable groups. Further, $X^+$ in the formula (5) represents an alkali metallic ion, and is preferably lithium ion.

The ends of molecular chains in the polyether polymer may be all polymerizable functional groups, all non-polymerizable functional groups, or may include both.

The average molecular weight (Mw) of the polyether polymer compound of the invention is not especially limited, but is usually from about 500 to 2 millions, and preferably from about 1000 to 1.5 millions.

2. Ion Conductible Polymer Composition

The ion conductible polymer composition of the invention contains the above polyether polymer compounds and an electrolytic salt, and further contains non-aqueous solvents if necessary.

The types of electrolytic salts are not especially limited Lithium salts, ammonium salts, phosphonium salts such as $(C_2H_5)_4PBF_4$, salts of protonic acids such as sulfuric acid and perchloric acid, salts containing boron atoms and ionic liquid are able to be used.

Specific examples of lithium salts include $LiPF_6$, $LiClO_4$, $LiAsF_6$, $LiCF_3SO_3$, $LiN(CF_3SO_2)_2$, $LiN(C_2F_5SO_2)_2$, $LiC(CF_3SO_2)_3$, LiCl, LiF, LiBr, LiI and derivatives thereof.

Specific examples of ammonium salts include $(CH_3)_4NBF_4$, $(CH_3)_4NBr$, $(CH_3)_4NI$, $(CH_3)_4NClO_4$, and $(C_2H_5)_4NBF_4$.

Examples of the salts comprising boron atoms include those represented by the following formula (6):

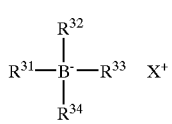

$$\begin{matrix} & R^{32} \\ & | \\ R^{31}- & B^- -R^{33} \quad X^+ \\ & | \\ & R^{34} \end{matrix} \quad (6)$$

wherein $R^{31}$, $R^{32}$, $R^{33}$, and $R^{34}$ in the formula (6) may be identical or different, and each represents hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic, —B($R^a$)($R^b$), —OB($R^a$)($R^b$) or OSi($R^a$)($R^b$)($R^c$). $R^a$, $R^b$ and $R^c$ each represents hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic or derivatives thereof. $R^{31}$, $R^{32}$, $R^{33}$, and $R^{34}$ in the formula (6) may bind together to form a ring, and the ring may have substituents. Also, each group may be substituted with substitutable groups. Further, $X^+$ represents an alkali metallic ion, and is preferably lithium ion.

Specific examples of ionic liquids include pyridine, pyrimidine, pyridazine, pyrazine, triazine, oxazole, thiazole, imidazole, pyrazole, isooxazole, thiadiazole, oxadiazole, and quaternary salts of derivatives thereof substituted with substitutable groups.

A concentration of the above electrolytic salt is usually in the range of from 1 to 10000 parts by weight, preferably from 2 to 5000 parts by weight, and more preferably from 5 to 2000 parts by weight based on 100 parts by weight of the polyether polymer compound.

One or more selected from the group of non-proton solvents consisting of carbonates, lactones, ethers, sulfolanes and dioxolanes can be used as the non-aqueous solvent.

A concentration of the electrolytic salt in the non-aqueous solution dissolving the electrolytic salt in the above non-aqueous solvent is usually in the range of from 0.01 mol/kg to 10 mol/kg, and preferably from 0.02 mol/kg to 6.0 mol/kg.

The combining ratio of the above polyether polymer composition to the non-aqueous solution is usually in the range of from 1/99 to 99/1 (weight ratio, the same hereinafter), preferably from 1/99 to 50/50, and more preferably from 1/99 to 30/70.

3. Electrochemical Devices

The ion conductible polymer composition of the invention is applicable for various electrochemical devices, and their examples include lithium battery, solar battery with enhanced coloring matters, fuel battery, and condenser.

4. EXAMPLES

The invention is specifically described by examples below, but the invention is not limited to the examples.

(1) Synthetic Example of the Polyether Polymer

Synthetic Example 1 (Synthesis of Compound 1)

In a pressure proof container, 9 g of KOH was added to 1 mol of glycerine as a starting material, the temperature was elevated to 100° C., then the pressure was reduced to 5 mmHg or less of decompression degree via a vacuum pump, and subsequently the temperature was elevated to 120° C. A monomer mixture obtained by mixing 20 mol of ethylene oxide and 20 mol of 2,3-epoxy-1-propanol was added thereto, and reacted at the temperature range of 120±5° C.

After termination of the reaction, 23 mol of t-BuOK was added to the pressure proof container, conduting alcoholation by elevating the temperature to 120° C. and reducing the pressure to 5 mmHg or less of decompression degree via the vacuum pump, and subsequently cooled to 80° C. Further, 23 mol of methyl chloride was reacted at 80±50° C. After termination of the reaction, excess acid was eliminated using an absorbent, and subsequently conducting dehydration and filtration afforded the polyether polymer modified at the ends.

Synthetic Example 2 (Synthesis of Compound 2)

In a pressure proof container, 9 g of KOH was added to 1 mol of triethylene glycol as a starting material, the temperature was elevated to 100° C., then the pressure was reduced to 5 mmHg or less of decompression degree via a vacuum pump, and subsequently the temperature was elevated to 120° C. A monomer mixture obtained by mixing 10 mol of ethylene oxide and 3 mol of 2,3-epoxy-1-propanol was added thereto, and reacted at the temperature range of 120±5° C.

After termination of the reaction, 3 mol of t-BuOK was added to the pressure proof container, conducting alcoholation by elevating the temperature to 102° C. and reducing the pressure to 5 mmHg or less of decompression degree via the vacuum pump, and followed by cooling to room temperature. Further, 3 mol of acryloyl chloride was added, and reacted at room temperature.

Separately, a boron compound was synthesized by reacting biphenyl-2,2'-diol and borane at a molar ratio at 1:1 in dichloromethane with ice-cooling and subsequently eliminating dichloromethane under reduced pressure. To the above reaction system, 2 mol of the boron compound was added and reacted at room temperature. Excess acid was eliminated using an absorbent, and subsequently conducting dehydration and filtration afforded the polyether polymer modified at the ends.

Synthetic Example 3 (Synthesis of Compound 3)

In a pressure proof container, 9 g of KOH was added to 1 mol of ethylene glycol as a starting material, the temperature was elevated to 100° C., then the pressure was reduced to 5 mmHg or less of decompression degree via a vacuum pump, and subsequently the temperature was elevated to 120° C. Further, 10 mol of 2,3-Epoxy-1-propanol was added, and reacted at the temperature range of 120±5° C.

After termination of the reaction, 12 mol of $CH_3OLi$ was placed in the pressure proof container, conducting alcoholation by elevating the temperature to 120° C. and reducing the pressure to 5 mmHg or less of decompression degree via the vacuum pump, and followed by cooling to room temperature.

Separately, 1,1,1,3,3,3-hexafluoro-2-propanol and borane were reacted at a molar ratio at 3:1 in dichloromethane at room temperature. To the above reaction system, 6 mol of the product was added, and further 6 mol of acryloyl chloride was added, and reacted at room temperature. Purifying using the absorbent, and dehydrating and filtrating afforded the polyether polymer modified at the ends.

Synthetic Example 4 (Synthesis of Compound 4)

In the pressure proof container, 1 mmol of $CH_3ONa$ as a starting material and 500 ml of dehydrated toluene were placed, and the temperature was elevated to 100° C. A monomer mixture obtained by mixing 1 mol of ethylene oxide and 0.6 mol of 2,3-epoxy-1-propanol was added thereto and reacted at the temperature range of 100±5° C.

After termination of the reaction, 0.603 mol of t-BuOK was dissolved in a 10-fold quantity of t-BuOH and placed in the pressure proof container to alcoholate, the temperature was elevated to 60° C., and 0.603 mol of acryloyl chloride was reacted at room temperature. After termination of the reaction, purifying using the absorbent and eliminating the solvent under reduced pressure afforded the polyether polymer modified at the ends.

Synthetic Example 5 (Synthesis of Compound 5)

In the pressure proof container, 9 g of KOH was added to 1 mol of triethyleneglycol monomethyl ether as a starting material, the temperature was elevated to 100° C., then the pressure was reduced to 5 mmHg or less of decompression degree via a vacuum pump, and subsequently the temperature was elevated to 120° C. A monomer mixture obtained by mixing 30 mol of ethylene oxide and 50 mol of 2,3-epoxy-1-propanol was added thereto, and reacted at the temperature range of 120±5° C.

After termination of the reaction, 30 mol of t-BuOK was added to the pressure proof container, conducting alcoholation by elevating the temperature to 120° C. and reducing the pressure to 5 mmHg or less of decompression degree via the vacuum pump, and followed by cooling to 80° C. Further, 20 mol of Butyl chloride was reacted at 80±5° C. and cooled to room temperature.

Separately, a boron compound was synthesized by reacting catechol and borane at a molar ratio of 1:1 in dichloromethane with ice-cooling and eliminating dichloromethane under reduced pressure. To the above reaction system, 21 mol of the boron compound was added, and reacted at room temperature. Further, 10 mol of acryloyl chloride was added and reacted at room temperature for 2 hours. After termination of the reaction, excess acid was eliminated using the absorbent, and subsequently conducting dehydration and filtration afforded the polyether polymer modified at the ends.

Synthetic Example 6 (Synthesis of Compound 6)

The polyether polymer modified at the ends was synthesized by the same technique as that of Compound 4 except that the type and quantity of the compounds described in Table 1 were used.

Synthetic Example 7 (Synthesis of Compound 7)

The polyether polymer modified at the ends was synthesized by the same technique as that of Compound 1 except that the type and quantity of the compounds described in Table 1 were used.

Synthetic Example 8 (Synthesis of Compound 8)

The polyether polymer modified at the ends was synthesized by the same technique as that of Compound 1 except that the type and quantity of the compounds described in Table 1 were used.

Synthetic Example 9 (Synthesis of Compound 9)

The polyether polymer modified at the ends was synthesized by the same technique as that of Compound 4 except that the type and quantity of the compounds described in Table 1 were used.

Synthetic Example 10 (Synthesis of Compound 10)

The polyether polymer modified at the ends was synthesized by the same technique as that of Compound 4 except that the type and quantity of the compounds described in Table 1 were used.

TABLE 1

| | Starting material | Ethylene oxide (mol) | 2,3-epoxy-1-propanol (mol) | Alcoholation reagent (type/mol) | Compound for modification of the ends (type/mol) |
|---|---|---|---|---|---|
| Compound 1 | glycerine | 20 | 20 | t-BuOK/23 | Methyl chloride/23 |
| Compound 2 | Triethylene glycol | 10 | 3 | t-BuOK/3 | Acryloyl chloride/3 2,2-biphenyldioleate borane/2 |
| Compound 3 | Ethylene glycol | 0 | 10 | CH$_3$OLi/12 | Tris(1,1,1,3,3,3,-hexafluoroisopropyl) borate/6 Acryloyl chloride/6 |
| Compound 4 | CH$_3$ONa | 1 | 0.6 | t-BuOK/0.603 (t-BuOH solution) | Acryloyl chloride/0.603 |
| Compound 5 | Triethylene-glycol monomethyl-ether | 30 | 50 | t-BuOK/30 | Butyl chloride/20 Allyl chloride/10 Catecholate borane/21 |
| Compound 6 | t-BuOK | 22 | 6 | t-BuOK/6.001 (t-BuOH solution) | Propyl chloride/5 Acryloyl chloride/1.001 |
| Compound 7 | Diglycerine | 50 | 30 | t-BuOK/34 | Hexyl bromide/32 Vinyl chloride/2 |
| Compound 8 | pentaerythritol | 100 | 100 | t-BuOK/105 | Methyl chloride/75 Allyl chloride/30 |
| Compound 9 | CH$_3$ONa | 10 | 1 | t-BuOK/1.001 (t-BuOH solution) | Ethyl chloride/0.2 Allyl chloride/0.801 |
| Compound 10 | t-BuOK | 2 | 13 | t-BuOK/13.001 (t-BuOH solution) | Methyl chloride/12.001 Vinyl chloride/1 |

(2) Preparation and Evaluation of the Ion Conductible Polymer Composition

The polyether polymer compound of the invention is usable for electrochemical devices with various intended uses utilizing the properties of ion conductance. In the following examples and comparative examples, ion conductance of the ion conductible polymer composition using this polyether polymer compounds was evaluated using lithium salt as an electrolytic salt.

Ion conductance of the ion conductible polymer composition was evaluated by making a film of 500 μm in thickness from each ion conductible polymer composition, punching out the film at 13φ which is sandwiched with 2 sheets of lithium metal punched out at 13φ, measuring a resistant value of the ion conductible polymer composition at 20° C. by the complex impedance method, and estimating an ion conductivity from the resistant value.

Example 1

The ion conductible polymer composition of 500 μm in thickness was obtained by dissolving 2 g of Compound 1, 8 g of Compound 2, 2 g of LiI and 0.1 g of AIBN in 1 g of acetonitrile, which solution was poured between the glass plates, and subsequently drying under vacuum at 80° C. for 4 hours.

Examples 2 to 4

The ion conductible polymer composition was obtained as is the case with Example 1 except that the type and quantity of the compounds and salts described in Table 2 were used.

Example 5

The ion conductible polymer composition of 500 mm in thickness was obtained by mixing and dissolving 1 g of Compound 4, 2.7 g of Li[CF$_3$SO$_2$)$_2$N], 9 g of γ-butyrolactone and 0.1 g of AIBN, which solution was poured between the glass plates, and subsequently leaving at 80° C. under an argon atmosphere for 2 hours.

Examples 6 to 8

The ion conductible polymer composition was obtained as is the case with Example 5 except that the type and quantity of the compounds, salt and non-aqueous solvents in Table 2 were used.

Comparative Example 1

The ion conductible polymer composition was obtained as is the case with Example 1 except that the type and quantity of the compound and salt in Table 2 were used.

Comparative Example 2

The ion conductible polymer composition was obtained as is the case with Example 5 except that the type and quantity of the compound, salt and non-aqueous solvent in Table 2 were used.

The type and quantity of the compounds, salts and non-aqueous solvents as well as the ion conductivity in the above examples and comparative examples are shown in Table 2.

The abbreviations for the non-aqueous solvents in Table 2 denote the followings, respectively; GBL: γ-butylolactone, EC: ethylene carbonate, DEC: diethylene carbonate, PC: propylene carbonate.

TABLE 2

| | Compound (type/quantity) | Electrolytic salt (type/quantity) | Non-aqueous solvent (type/quantity) | Ion conductivity (S/cm) |
|---|---|---|---|---|
| Example 1 | Compound 1/2 g + Compound 2/8 g | LiI/2 g | — | 1 × 10$^{-4}$ |
| Example 2 | Compound 3/5 g + Compound 6/5 g | LiBF$_4$/0.5 g | — | 3 × 10$^{-4}$ |
| Example 3 | Compound 5/10 g | LiPF$_4$/3 g | — | 2 × 10$^{-4}$ |
| Example 4 | Compound 8/10 g | LiClO$_4$/1 g | — | 1 × 10$^{-4}$ |

TABLE 2-continued

|  | Compound (type/quantity) | Electrolytic salt (type/quantity) | Non-aqueous solvent (type/quantity) | Ion conductivity (S/cm) |
|---|---|---|---|---|
| Example 5 | Compound 4/1 g | Li[CF$_3$SO$_2$)$_2$N]/2.7 g | GBL/9 g | 3.0 × 10$^{-3}$ |
| Example 6 | Compound 7/1 g | LiBF$_4$/0.5 g | EC/2 g + GBL/6 g | 1.7 × 10$^{-3}$ |
| Example 7 | Compound 9/1 g | LiPF$_4$/3 g | EC/2 g + GBL/5 g + DEC/1 g | 2.5 × 10$^{-3}$ |
| Example 8 | Compound 10/1 g | LiClO$_4$/1 g | PC/3 g + GBL/3 g | 2.0 × 10$^{-3}$ |
| Comparative Example 1 | PEO with molecular weight of 150,000/10 g | Li[CF$_3$SO$_2$)$_2$N]/3 g | — | 9 × 10$^{-7}$ |
| Comparative Example 2 | PEO with molecular weight of 150,000/1 g | LiBF$_4$/1 g | GBL/9 g | Incapable measurement |

The ion conductible polymer composition of the invention using polyether polymer(s) exhibits a high ion conductivity in room temperature and is suitably used for various electrochemical devices using ion conductible polymer compositions.

What is claimed is:

1. A polyether polymer compound having a structure unit represented by a formula (1) and at least one of a structure unit represented by a formula (2) and a structure unit represented by a formula (3), wherein the formulas (1), (2) and (3) are as follows:

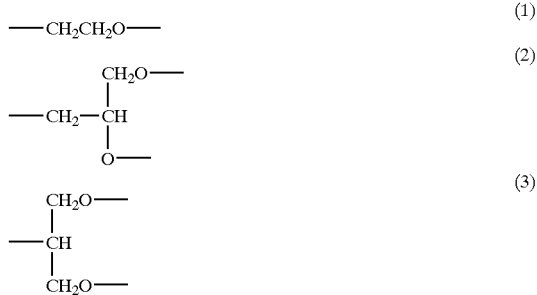

and wherein said polyether polymer compound is obtained by reacting 2,3-epoxy-1-propanol and ethylene oxide with a starting material; to at least one end of a resulting molecular chain, a polymerizable functional group is linked; and to each of other ends of said molecular chain, a polymerizable or non polymerizable functional group is linked.

2. The polyetherpolymer compound according to claim 1, wherein each said polymeric functional group is one or more selected from the group consisting of (meth) acrylate-containing groups, allyl and vinyl groups, and each said non-polymeric functional group is one or more selected from alkyl groups of from 1 to 6 carbons and functional groups containing boron atoms.

3. An ion conductible polymer composition containing one or more polyether polymer compounds according to claim 1.

4. An ion conductible polymer composition containing one or more polyether polymer compounds according to claim 1 and an electrolytic salt.

5. The ion conductible polymer composition according to claim 4, further containing at least one non-aqueous solvent.

6. The ion conductible polymer composition according to any one of claims 3 to 5, wherein said polyether polymer compounds are crosslinked.

7. An electrochemical device comprising the ion conductible polymer composition according to any one of claims 3 to 5.

8. An electrochemical device comprising the ion conductible polymer composition according to claim 6.

9. The polyether polymer compound according to claim 1 or 2, wherein said starting material is a compound having one of: at least one active hydrogen residue, and an alkoxide.

10. The polyether polymer compound according to claim 1 or 2, wherein said polymerizable functional group is a (meth)acrylate-containing group; and said non-polymerizable functional group is an alkyl group having from 1 to 6 carbon atoms.

* * * * *